US008140071B2

(12) United States Patent
Tak

(10) Patent No.: US 8,140,071 B2
(45) Date of Patent: Mar. 20, 2012

(54) APPARATUS AND METHOD FOR DISPLAYING STATUS OF SUPPLEMENTARY SERVICE OF MOBILE EQUIPMENT

(75) Inventor: Hyun-Wook Tak, Seoul (KR)

(73) Assignee: Samsung Electronics Co., Ltd (KR)

( * ) Notice: Subject to any disclaimer, the term of this patent is extended or adjusted under 35 U.S.C. 154(b) by 1546 days.

(21) Appl. No.: 11/344,982

(22) Filed: Feb. 1, 2006

(65) Prior Publication Data

US 2006/0172734 A1     Aug. 3, 2006

(30) Foreign Application Priority Data

Feb. 1, 2005   (KR) .................................. 2005-9099

(51) Int. Cl.
*H04W 4/00*   (2009.01)
*H04M 1/00*   (2006.01)

(52) U.S. Cl. ............... 455/435.1; 455/435.2; 455/435.3; 455/433; 455/558; 455/559

(58) Field of Classification Search .... 455/412.1–412.2, 455/433–435.1, 432.1, 558–559, 435.3; 709/205
See application file for complete search history.

(56) References Cited

U.S. PATENT DOCUMENTS

| 5,898,681 | A  | * | 4/1999  | Dutta .............................. 370/229 |
| 6,014,561 | A  | * | 1/2000  | Molne ........................... 455/419 |
| 7,174,174 | B2 | * | 2/2007  | Boris et al. .................... 455/461 |
| 7,266,371 | B1 | * | 9/2007  | Amin et al. .................... 455/419 |
| 2004/0205212 | A1 | * | 10/2004 | Huotari et al. ................ 709/230 |
| 2005/0180550 | A1 | * | 8/2005  | McGee et al. ............. 379/88.18 |
| 2006/0143098 | A1 | * | 6/2006  | Lazaridis ........................ 705/34 |

FOREIGN PATENT DOCUMENTS

| KR | 1020010019047 | 3/2001 |
| KR | 1020020048020 | 6/2002 |
| KR | 1020040095827 | 11/2004 |
| WO | WO 00/16576 | 3/2000 |

* cited by examiner

*Primary Examiner* — Olumide T Ajibade Akonai
*Assistant Examiner* — Emem Stephen
(74) *Attorney, Agent, or Firm* — The Farrell Law Firm, P.C.

(57) ABSTRACT

Disclosed are an apparatus and a method in which a user can instantly check the status of one or more supplementary services without using a menu. The apparatus includes a network for processing a request for registration, activation or release of a supplementary service from an ME, a card for storing an elementary file including the status of the supplementary service of the ME, which is received from the network when the card has been inserted into the ME, and an SMS service center for informing the ME of processing results for the registration, activation or release of the supplementary service at the network's request.

10 Claims, 12 Drawing Sheets

| Identifier: '6F EE' | Structure: transparent | | Mandatory |
|---|---|---|---|
| File Size: 4 bytes | | | Update Activity: low |
| Access Conditions:<br>READ        PIN1(CHV1)<br>UPDATE    PIN1(CHV1)<br>ACTIVATE  ADM<br>DEACTIVATE ADM | | | |
| Bytes | Description | M/O | Length |
| 1 | Line Number/ Call Forwarding | M | 1 byte |
| 2 | Call Barring | M | 1 byte |
| 3 | Call Completion | M | 1 byte |
| 4 | Other Services | M | 1 byte |

FIG.6

| CLIP | CLIR | COLP | COLR | CFU | CFB | CFNRy | CFNRc |
|---|---|---|---|---|---|---|---|

FIG.7A

| BAOC | BOIC | BOIC-exHC | BAIC | BIC-Roam | Reserved | Reserved | Reserved |
|---|---|---|---|---|---|---|---|

FIG.7B

| CH | CW | CCBS | UUS | Reserved | Reserved | Reserved |
|---|---|---|---|---|---|---|

FIG.7C

| MPTY | CUG | AoC | eMLPP | CNAP | ETC | Reserved |
|---|---|---|---|---|---|---|

FIG.7D

| CLA (Class) | INS (Instruction code) | P1 | P2 | P3 | Data |

FIG.8

APPARATUS AND METHOD FOR DISPLAYING STATUS OF SUPPLEMENTARY SERVICE OF MOBILE EQUIPMENT

PRIORITY

This application claims priority to an application entitled "Apparatus and Method For Displaying Status Of Supplementary Service Of ME" filed in the Korean Intellectual Property Office on Feb. 1, 2005 and assigned Ser. No. 2005-9099, the contents of which are incorporated herein by reference.

BACKGROUND OF THE INVENTION

1. Field of the Invention

The present invention relates generally to an apparatus and a method for displaying the status of a supplementary service of a Mobile Equipment (ME) in a mobile communication system, and more specifically, to an apparatus and a method in which a user can check the status of one or multiple supplementary services at one time without using a menu.

2. Description of the Related Art

A method for displaying the status of a supplementary service for which a user has registered on the screen of an ME, so that the user can check the status of the supplementary service includes the following two functions:

1) an interrogate function of a call independent supplementary service; and
2) a Customer Service Profile (CSP) function provided by a Common PCN Handset Specification (CPHS).

Hereinafter, the interrogate function will be described. An ME user may register for various types of supplementary services, including:

- a call forwarding service group: Call Forwarding Unconditional (CFU), Call Forwarding Busy (CFB), Call Forwarding No Reply (CFNRy), and Call Forwarding Not Reacheable (CFNRc);
- a call barring service group: Barring of All Outgoing Calls supplementary service (BAOC), Barring of Outgoing International Calls supplementary service (BOIC), Barring of Outgoing International Calls except those directed to the Home PLMN Country supplementary service (BOIC exHC), Barring of All Incoming Calls supplementary service (BAIC), Barring of Incoming Calls when Roaming outside the home PLMN country (BIC Roam);
- Call Hold (CH), Call Waiting (CW), Call Completion to Busy Subscriber (CCBS), User to User Signaling (UUS), Multiparty (MPTY), Closed User Group (CUG), and Advice of Charge (AoC); and
- line identification service group: Calling Line Identification Presentation (CLIP), Calling Line Identification Restriction (CLIR), Connected Line Identification Presentation (COLP) and Connected Line Identification Restriction (COLR).

An ME user may register for one or multiple supplementary services as described above. After registering, the user may check if the user has registered for each supplementary service and the status of each supplementary service by means of an interrogate command.

FIGS. 1A to 1F are diagrams illustrating a process for checking the status of a CFU by means of an interrogate command.

FIG. 1A shows a menu screen that displays a plurality of menus including a phone, a display and a dialer.

FIG. 1B shows a sub-menu screen displayed when dialer is selected. The sub-menu of the dialer selection includes a plurality of services such as call forwarding and call waiting.

FIG. 1C shows a sub-menu screen displayed when call forwarding is selected from the sub-menu screen. The sub-menu of the call forwarding selection includes a plurality of services such as CFU and CFB.

FIG. 1D shows a sub-menu screen displayed when CFU is selected from the sub-menu screen. The sub-menu of the CFU selection includes a plurality of operations such as "register" and "interrogate".

FIG. 1E is a diagram illustrating a process that occurs after "interrogate" is selected from the sub-menu until an ME transmits the interrogate command to a network and receives a response.

In FIG. 1E, an API represents an application program of an ME for providing a User Interface (UI). Tasks of an ME include an SS (supplementary service) and an MM (mobility management).

MNSS_BEGIN_REQ represents a start request for a status check of an SS, which is transmitted from the API to the SS when a user requests such a status check. MNSS is an abbreviation for "Mobile Network Supplementary Service". MNSS_EST_REQ represents that the SS requests the MM to establish channels. EST is an abbreviation for "Establish". REGISTER represents a request to a network. Facility [Invoke=InterrogateSS (CLIP)] represents an Interrogation for the status of the CLIP in supplementary services. RELEASE COMPLETE represents a response for a register operation. Facility [Return Resul=InterrogateSS (SS-Status)] represents the current status result values of each supplementary service. MMSS_REL_IND represents a command for reporting a channel release, and MMSS_END_IND represents a command for reporting an end of a process.

The facility corresponds to an element in a sent REGISTER or RELEASE COMPLETE message. Further, the facility includes parameters therein. For example, the facility includes an interrogate parameter for requesting the status of each supplementary service, a parameter representing current status result values of each supplementary service, etc.

In contrast to REGISTER in FIG. 1E, Register on the screen of FIG. 1D may be selected by a user for registration of a supplementary service. FIG. 1F illustrates a Result screen displayed when the ME receives the response including the status of the supplementary service after transmitting the interrogate command to the network. In FIG. 1F, the CFU service is activated and the registered phone number is 02-123-4567.

Typically, a user intuitively desires to instantly check the status of a service for which the user has registered, but the status of the service is not actually checked at an instant. In other words, it is necessary to transmit an interrogate command for requesting the status of a service and perform a corresponding operation (selection of items from a menu screen or a sub-menu screen, etc.) for the transmission of the interrogate command. Therefore, a user is inconvenienced. Considering that a user generally registers for several services, the user must enter a sub-menu each time and transmit an interrogate command when the user wants to check a status for each service. This may increase user inconvenience as well as cost.

Hereinafter, the CSP function provided by the CPHS will be described.

The CSP function, which belongs to services of the CPHS, stores the status of an available supplementary service in an Elementary File (EF) CSP within a (U)SIM, and displays or activates a menu item only when a specific supplementary service has been activated. The (U)SIM is a term representing both a Subscriber Identity Module (SIM) and a Universal Subscriber Identity Module (USIM). The USIM is another name indicating a UMTS smart card. In order to use the EF CSP, an additional EF "EF CPHS Information (CPHSI)", indicating that the CSP service has been allocated and activated, is required. Herein, because other EFs associated with the CPHS generally implement a request, it is not easy to provide only a single CSP service.

FIGS. 2A to 2D are diagrams illustrating menu screens of an ME equipped with a (U)SIM card to which the CSP of the CPHS is not provided FIG. 2A shows a screen which displays various menus including Phone, Display and Call. FIG. 2B shows a screen displayed when Call has been selected, and includes Caller ID and Forwarding. FIG. 2C shows a screen displayed when the Call Forwarding has been selected, and includes Voice Call and Data Call. FIG. 2D shows a screen displayed when Voice Call has been selected, which shows all services which a user has registered for or not.

FIGS. 3A to 3D are diagrams illustrating screens of an ME equipped with a (U)SIM card to which the CSP of the CPHS is provided. The screens display only the supplementary services for which a user has registered or the accessible supplementary services.

FIG. 3A shows a screen which displays various menus including Phone, Display and Call. FIG. 3B shows a sub-menu screen displayed when Call has been selected, and displays only services having been set to 1 in the EF CSP, such as Forwarding and Waiting. FIG. 3C shows a screen displayed when Call Forwarding has been selected, and includes Voice Call and Data Call. FIG. 3D shows a screen displayed when Voice Call has been selected, and displays the activated services for which a user has registered in bold representation.

The CSP of the CPHS as described above is a precondition for the use of the EF CSP within the (U)SIM card, and the EF CPHSI must also exist. Further, a network provider generally does not want only the CSP service in the CPHI function. Therefore, the necessary consideration of other CPHI functions is an inconvenience.

In addition, if a user purchases the (U)SIM card in which the EF CSP has been set by a provider, the (U)SIM is not intermediately updated. Thus, a user is further inconvenienced.

SUMMARY OF THE INVENTION

Accordingly, the present invention has been made to solve the above-mentioned problems occurring in the prior art, and it is an object of the present invention to provide an apparatus and a method for displaying on a screen the status of at least one supplementary service that an ME user desires to check, through one simple operation.

It is another object of the present invention to provide an apparatus and a method for displaying on one screen the statuses of supplementary services that an ME user desires to check.

It is another object of the present invention to provide an apparatus and a method for displaying the supplementary services for which an ME user has registered, separately from the supplementary services for which the ME user has not registered.

In order to accomplish the aforementioned objects, there is provided an apparatus for displaying a status of a supplementary service of a Mobile Equipment (ME), including a network for processing a request for registration, activation or release of a supplementary service from the ME, a card for storing an elementary file including the status of the supplementary service of the ME, which is received from the network, when the card has been inserted into the ME, and an SMS service center for informing the ME of processing results for the registration, activation or release of the supplementary service at the network's request.

There is further provided a method for reporting a status of a supplementary service in a Mobile Equipment (ME) which can contact with a card, including checking if a request for a status of a supplementary service is received from a user, reading information for the status of the supplementary service from the card when the request is received from the user, and simultaneously displaying the read information.

In addition, there is provided a method for informing by a network a Mobile Equipment (ME) which can contact with a card of a status of a supplementary service, including checking if a request for a registration of a supplementary service is received from the ME, performing a corresponding registration for a home location register of the ME when the request is received from the ME, and informing the ME of results of the registration by means of a Point-to-Point (PP) download SMS message.

BRIEF DESCRIPTION OF THE DRAWINGS

The above and other objects, features and advantages of the present invention will be more apparent from the following detailed description taken in conjunction with the accompanying drawings, in which:

FIG. 6 is a diagram illustrating the structure of an EF SSInfo according to the present invention;

FIGS. 7A to 7D are diagrams illustrating examples in which each byte of the EF SSInfo shown in FIG. 6 is used;

FIG. 8 is a diagram illustrating the format of a command according to the present invention;

DETAILED DESCRIPTION OF THE PREFERRED EMBODIMENT

Preferred embodiments of the present invention will be described in detail herein below with reference to the accompanying drawings. In the below description, particular items, such as a detailed screen display contents are shown to aid in the general understanding of the present invention, and it is apparent to those skilled in the art that the present invention can be embodied even without these particular items. In the following description, a detailed description of known functions and configurations incorporated herein will be omitted for the sake of clarity and conciseness.

The present invention stores information regarding registration or non-registration, or activation or deactivation, etc., for various supplementary services of an ME in a (U)SIM card by means of a specific network message, thereby simultaneously displaying the stored information on a screen at a user's request.

Figure 1A:
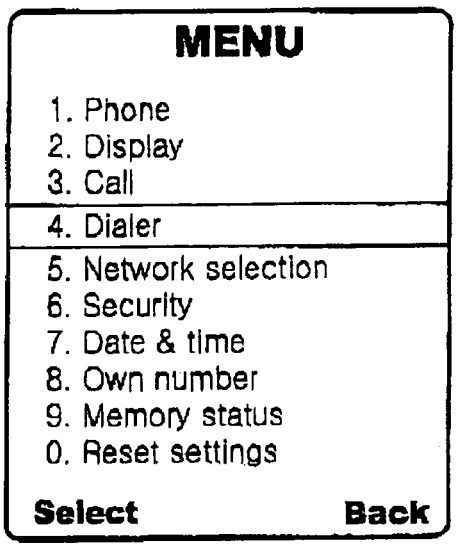
FIGS. 1A to 1F are diagrams illustrating a process for checking the status of a CFU by means of an interrogate command.
Figure 1B:
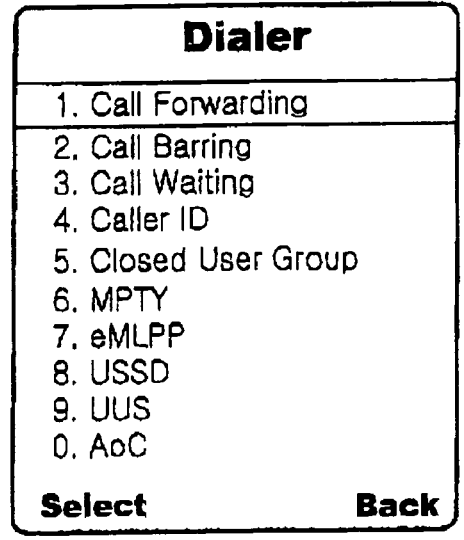
Figure 1C:
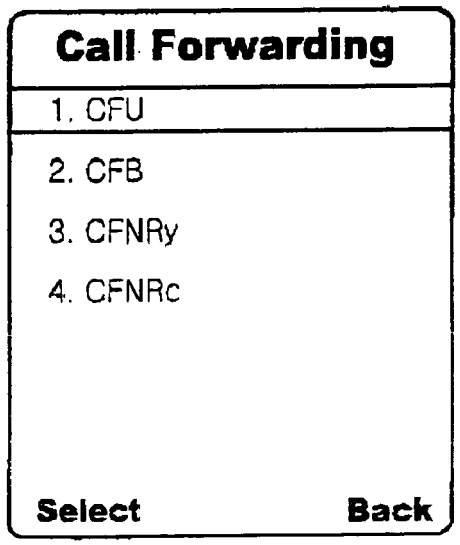
Figure 1D:
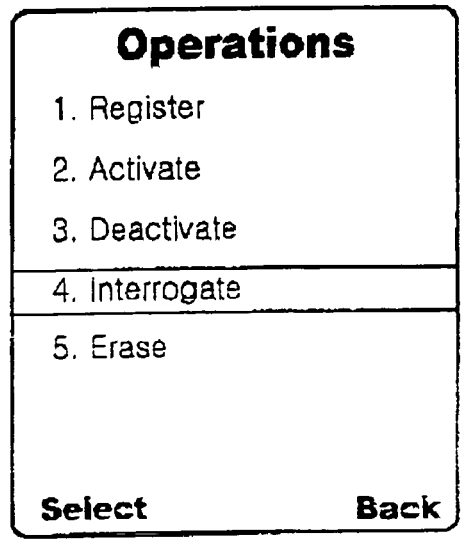
Figure 1E:
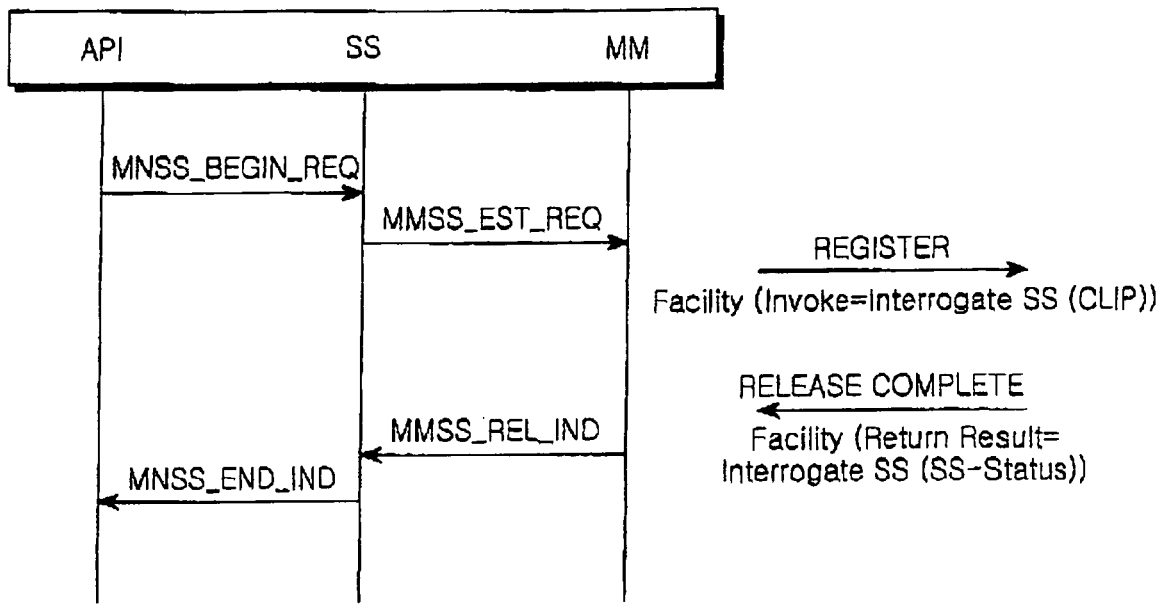
Figure 1F:
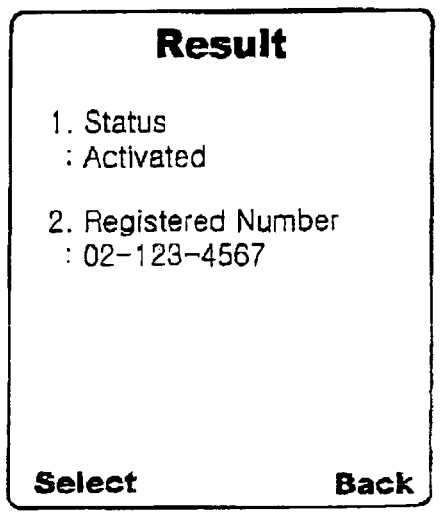
Figure 2A:
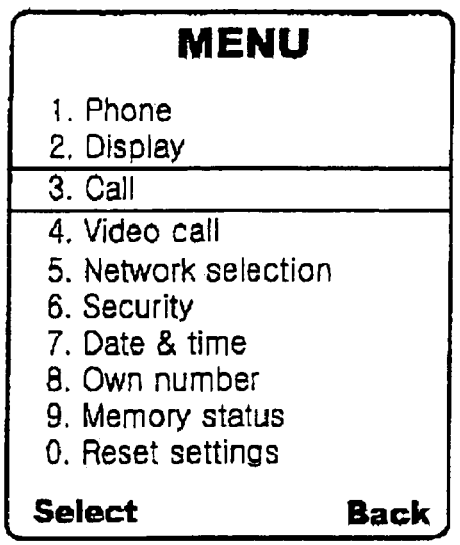
FIGS. 2A to 2D are diagrams illustrating menu screens of an ME equipped with a (U)SIM card to which the CSP of a CPHS is not provided.
Figure 2B:
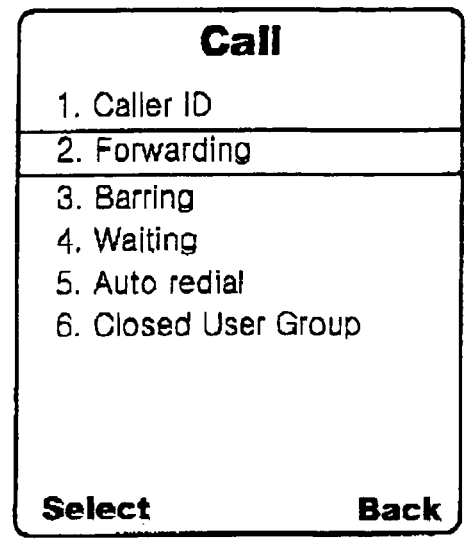
Figure 2C:
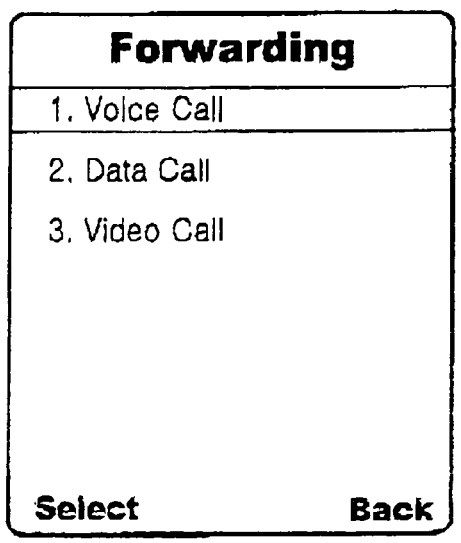
Figure 2D:
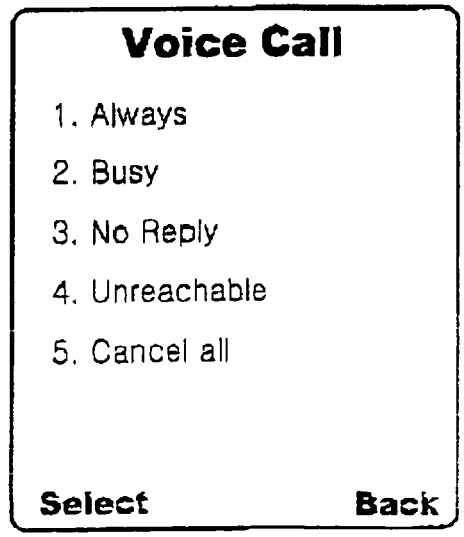
Figure 3A:
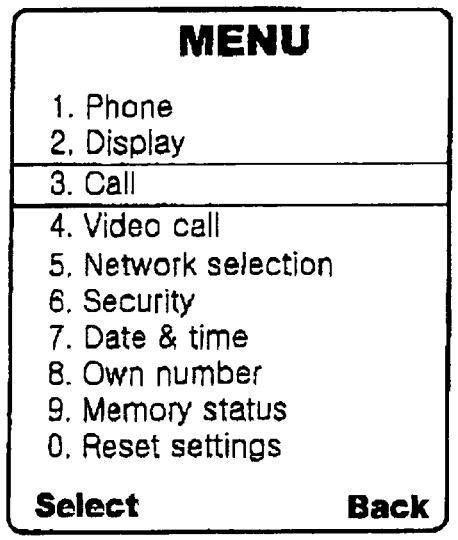
FIGS. 3A to 3D are diagrams illustrating screens of an ME equipped with a (U)SIM card to which the CSP of a CPHS is provided.
Figure 3B:
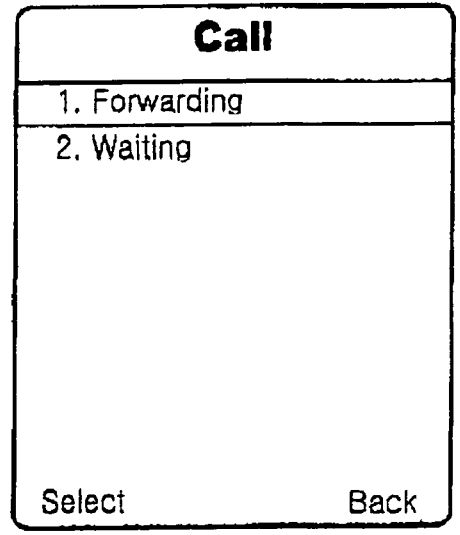
Figure 3C:
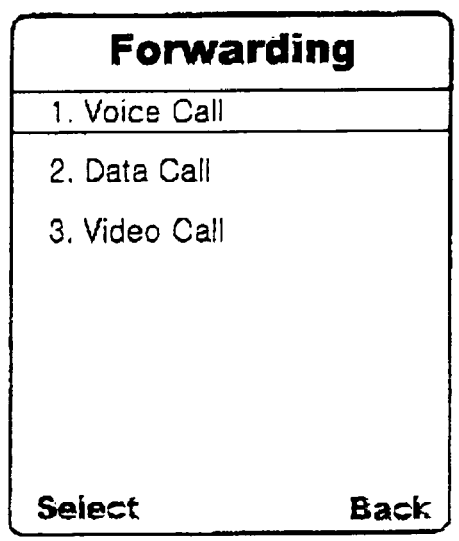
Figure 3D:
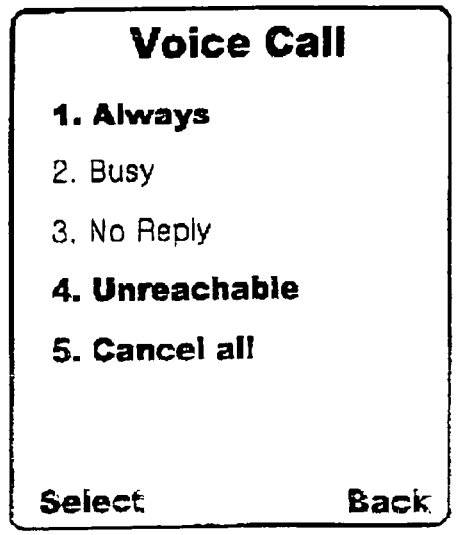
Figure 4:
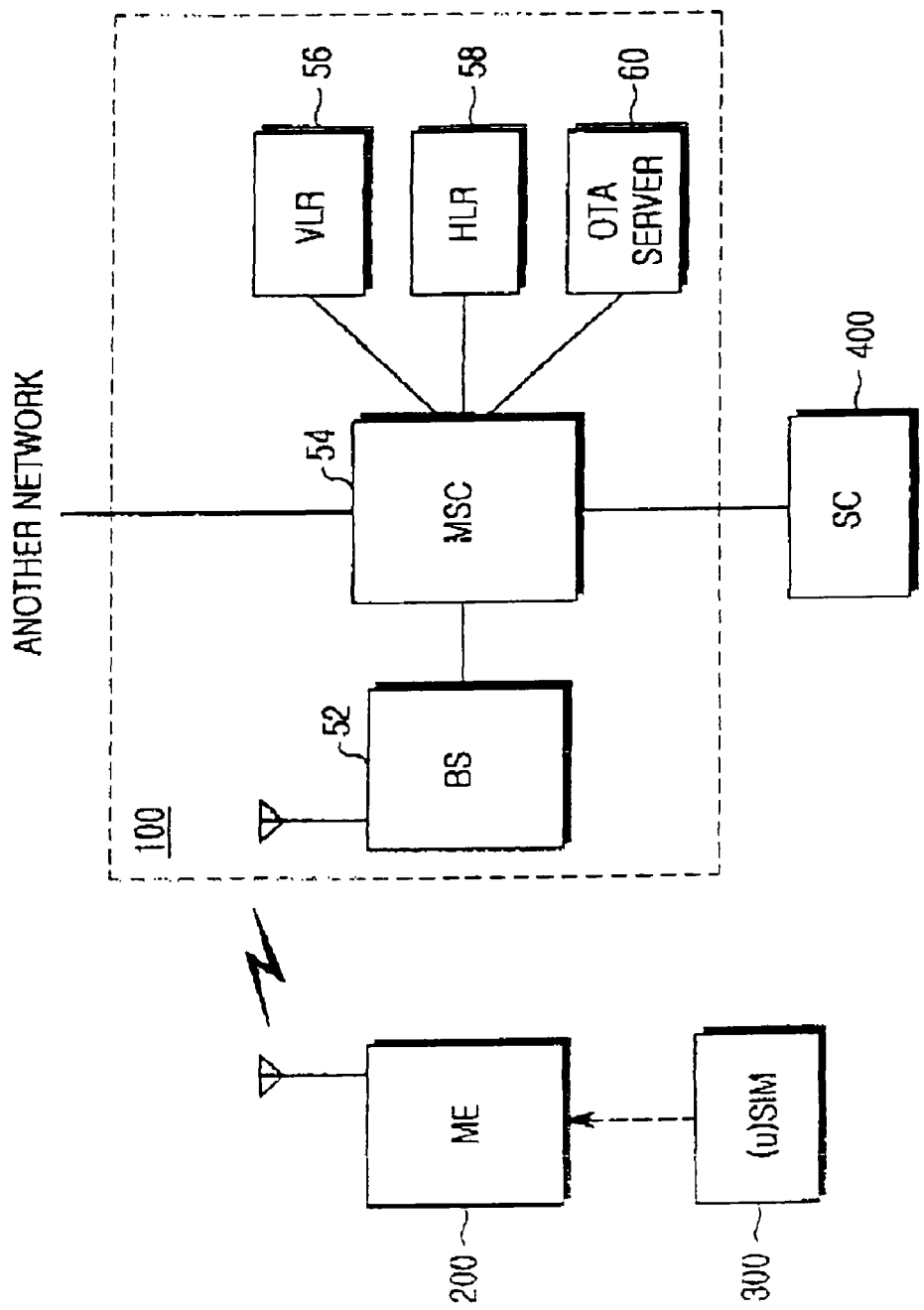
FIG. 4 is a block diagram schematically illustrating an interface among a network, an ME and a (U)SIM card according to the present invention.

FIG. 4 is a block diagram schematically illustrating a network interface, an ME and a (U)SIM card according to the present invention.

Referring to FIG. 4, 100 represents a network, 200 represents an ME 200 which can access the network 100, and 300 represents a (U)SIM card detachable from the ME 200. 400 represents an SMS Service Center (SC) for performing an SMS Point-to-Point (PP) download to the ME 200 according to a command packet (see FIG. 8) received from the network 100.

The network 100 includes a Base Station (BS) 52, a Mobile Station Center (MSC) 54, a Visitor Location Register (VLR) 56, a Home Location Register (HLR) 58 and an Over The Air (OTA) server 60. Information regarding registration or non-registration, or activation or deactivation for supplementary services is stored in the HLR 58 via the BS 52 and the MSC 54.

The concept of an OTA is disclosed in detail in the $3^{rd}$ Generation Partnership Project (3GPP) Technical Specification (TS) 03.48 V8.8.0 (2001-12). It is also possible to refer to the TS 23.038, the TS 23.048, the TS 23.040, the TS 24.011, the TS 03.19, etc.

According to the present invention, whenever an ME user registers for certain supplementary services or deletes previously registered supplementary services, corresponding information is stored from the network 100 to the (U)SIM card 300 through an SMS PP download, or is deleted. Accordingly, status information for supplementary services can be stored in the (U)SIM card 300, and can be directly displayed when a user wants to know the corresponding information.

Figure 5:
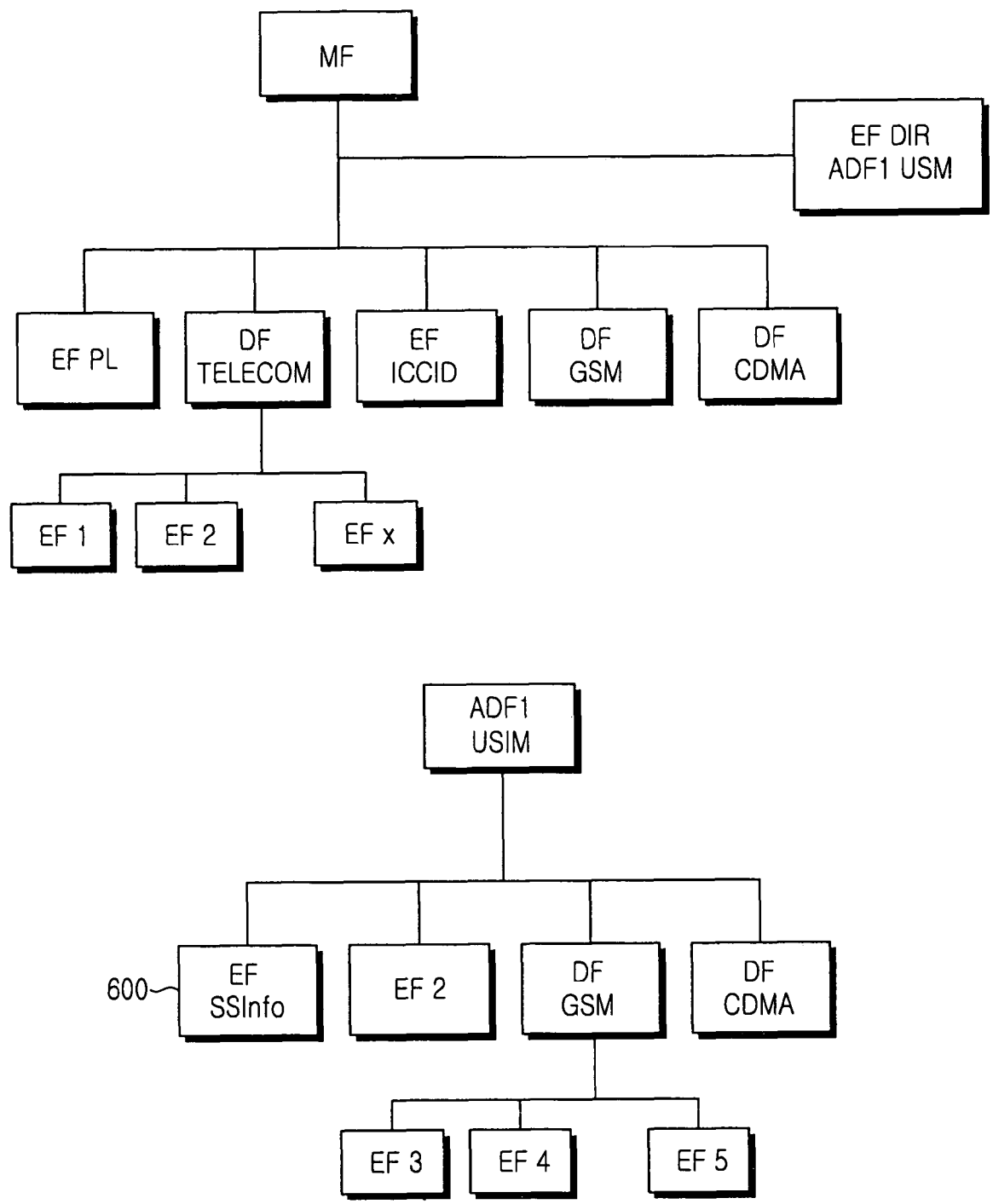
FIG. 5 is a diagram illustrating the structure of a (U)SIM card according to the present invention.

FIG. 5 is a diagram illustrating the structure of the (U)SIM card according to the present invention.

The (U)SIM card 300 must additionally include a Supplementary Service Information Elementary File (EF SSInfo), and the EF SSInfo is disposed under the Application Dedicated File (ADF) (U)SIM as illustrated in FIG. 5. The EF SSInfo is updated through the SMS PP download from the network when an ME user registers for new supplementary services or deletes the previously registered supplementary services, as described in FIG. 4.

Since the structure excepting for the EF SSInfo is disclosed in the European Telecommunications Standards Institute (ETSI) TS102.221, details of the structure will be omitted.

FIG. 6 is a diagram illustrating the structure of the EF SSInfo according to the present invention.

An Administration notification (ADM) represents a secret number which is only known by an administrator. An M/O represents "mandatory" or "optional". M represents a field which must be necessarily included. Update activity: low represents there is no obstacle in updating a corresponding EF. A PIN 1 is an abbreviation for a personal identity number, and a CHV is an abbreviation for a card holder verification.

The EF SSInfo includes four bytes for indicating activation or deactivation of a supplementary service. The first byte indicates a line number and call forwarding services, the second byte indicates a call barring service, the third byte indicates a call completion service and the fourth byte indicates other services.

FIGS. 7A to 7D are diagrams illustrating examples in which each byte of the EF SSInfo shown in FIG. 6 is used.

FIG. 7A shows the first byte indicating the line number and the call forwarding services. The first bit to the fourth bit corresponding to the line number designate a Calling Line Identification Presentation (CLIP), a Calling Line Identification Restriction (CLIR), a Connected Line Identification Presentation (COLP) and a Connected Line Identification Restriction (COLR), respectively. The fifth bit to the eighth bit corresponding to the call forwarding services designate a Call Forwarding Unconditional (CFU), a Call Forwarding Busy (CFB), a Call Forwarding No Reply (CFNRy), and a Call Forwarding Not Reacheable (CFNRc), respectively.

FIG. 7B shows the second byte indicating the call barring service. The first bit to the eighth bit correspond to a Barring of All Outgoing Calls supplementary service (BAOC), a Barring of Outgoing International Calls supplementary service (BOIC), a Barring of Outgoing International Calls except those directed to the Home PLMN Country supplementary service (BOIC exHC), a Barring of All Incoming Calls supplementary service (BAIC), a Barring of Incoming Calls when Roaming outside the home PLMN country (BIC Roam), a Reserved, a Reserved, and a Reserved, respectively.

FIG. 7C shows the third byte indicating the call completion service. Referring to FIG. 7C, the first bit to the eighth bit correspond to a Call Hold (CH), a Call Waiting (CW), a Call Completion to Busy Subscriber (CCBS), a User to User Signaling (UUS), a Reserved, a Reserved, a Reserved, and a Reserved, respectively.

FIG. 7D shows the fourth byte indicating other services. Referring to FIG. 7D, the first bit to the eighth bit correspond to a Multiparty (MPTY), a Closed User Group (CUG), an Advice of Charge (AoC), an enhanced Multilevel Precedence and Pre-emption (eMLPP), a Calling Name Presentation (CNAP), an Explicit Call Transfer (ETC), a Reserved, and a Reserved, respectively.

In the file structure as illustrated in FIGS. 7A to 7D, each bit corresponding to supplementary services in an activated state is set to 1, and each bit corresponding to supplementary services in a deactivated state is set to 0.

FIG. 8 is a diagram illustrating the format of a command according to the present invention.

The command represents an APDU sent from an ME to the USIM. The command includes a communication scheme Class (CLA), a command Instruction code (INS), processing schemes P1 and P2 of the command, length P3 of data, and actual data. For example, if a command is "00 (CLA) A4 (INS) 00 (P1) 00 (P2) 02 (Le) 3F 00 (Data: FID)", the "00" represents a GSM, the "A4" represents a selection, each "00" of the P1 and the P2 represents a scheme of the selection, the "02" represents two bytes, and the "3F 00" represents a Master File (MF). In short, the command denotes a selection command (Select MF) of the MF. Likewise, if a command is "00 A4 00 00 02 XX XX (AID of ADF (U)SIM)", the command denotes a selection command (Select ADF (U)SIM) of the ADF (U)SIM). If a command is "00 A4 00 00 02 6F EE", the command denotes a selection command (Select EF SSInfo) of an EF SSInfo. If a command is "00 D6 (INS) 00 00 04 (Lc), 80 40 C0 40 (Data)", the command denotes an update command (Update Binary EF SSInfo) of the EF SSInfo. The relation among the MF, the ADF and the EF SSInfo is illustrated in FIG. 5. In order to access the EF SSInfo, the aforedescribed commands are required to sequentially access the MF and the ADF.

Figure 9:
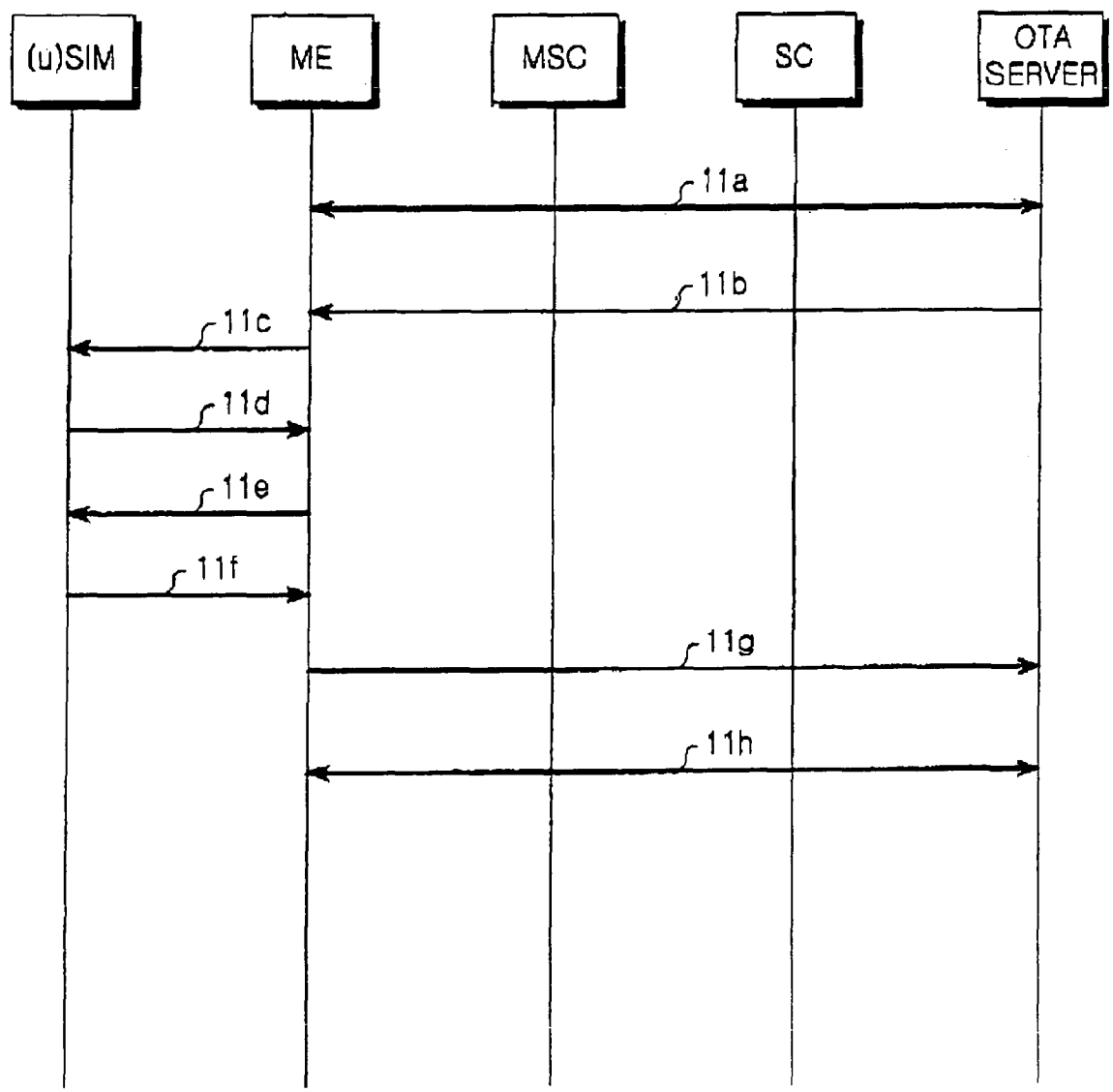
FIG. 9 is a ladder diagram illustrating a procedure for processing an OTA according to the present invention.

FIG. 9 is a ladder diagram illustrating a procedure for processing an OTA according to the present invention.

The ME represents a mobile communication terminal, the MSC represents a mobile station center and the SC represents an SMS service center.

In step 11a, an OTA channel is generated. That is, a Technical Specification (TS) 23.048 OTA request/response begins.

In step 11b, a data burst is received from an OTA server to the ME. The data burst includes a TS 23.048 command packet. That is, in relation to the data burst, a security-related header used for the OTA disclosed in a TS 23.048 is applied to a general SMS.

When the received data burst is an SMS-PP, a (U)SAT (SIM Application Toolkit) of the ME makes an envelop command of the SMS-PP, and transfers the processed SMS-PP to the (U)SIM. The SMS-PP differs from the general SMS. The envelope processing is a command used for the SAT, which represents a command sent from the ME to the (U)SIM. The (U)SIM detects a security packet field and a header field from the SMS-PP, obtains necessary information from the security packet field and the header field, and deletes the security packet field and the header field.

The Me determines the received data burst as the SMS-PP when the ME has decoded an SMS header, and has recognized that a Protocol ID (PID) is a "7F" and a Data Coding Scheme (DCS) is a "class 2".

In step 11d, the (U)SIM informs the ME of success or failure of an update. For example, when it is assumed that an SMS-PP envelope command representing a registration of a CLIP, a CFU, a BOIC, a CW, a CH and a CUG is received, the (U)SIM decodes a corresponding packet, and sets corresponding CLIP, CFU, BOIC, CW, CH and CUG bits within an EF SSInfo to 1 as shown below for update.

First byte: "1000 1000"
Second byte: "0100 0000"
Third byte: "1100 0000"
Fourth byte: "0100 0000"

Then, if a request for a currently activated service is received from a user, data can be read by a read binary generic command, and simultaneously displayed.

In step 11e, the ME transmits a reception response to the (U)SIM.

In step 11f, the (U)SIM informs the ME that the (U)SIM has received the SMS-PP.

In step 11g, the ME informs the OTA that the (U)SIM has received the SMS-PP.

In step 11h, the OTA channel is released. That is, the TS 23.048 OTA request/response ends.

Figure 10A:
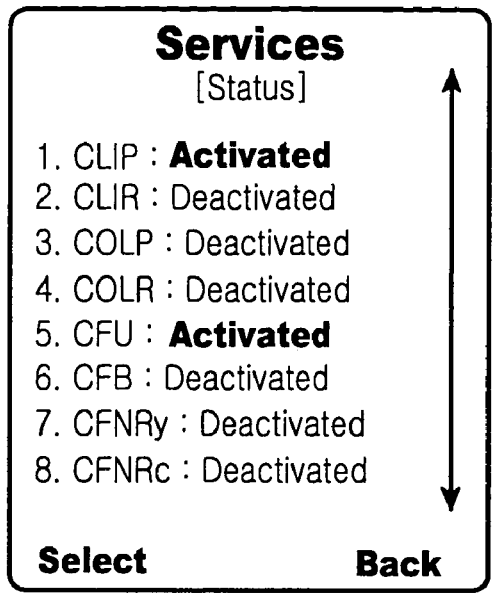
FIGS. 10A and 10B are diagrams illustrating screens for displaying the status of a supplementary service according to the present invention.
Figure 10B:
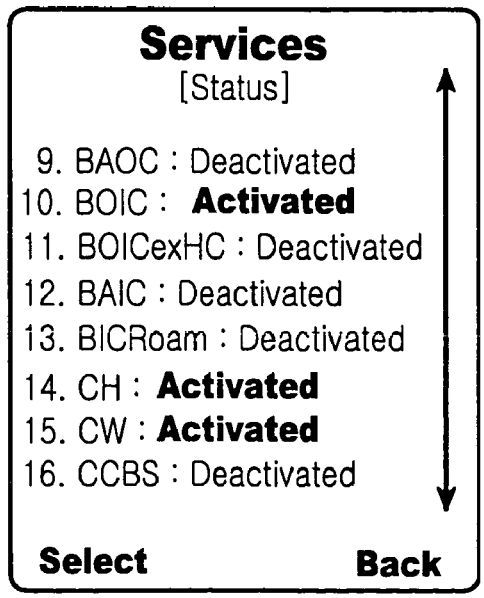

FIGS. 10A and 10B are diagrams illustrating screens for displaying the status of a supplementary service according to the present invention.

If the screen of FIG. 10A is scrolled, the screen of FIG. 10B is displayed. When it is assumed that the number of supplementary services which a user desires to check is 16, but only eight supplementary services can be displayed, the user may first check eight supplementary services as illustrated in FIG. 10A, and then scroll down the screen of FIG. 10A to check the other eight supplementary services, as illustrated in FIG. 10B.

According to the present invention, whenever supplementary services are activated or deactivated, an update is automatically performed through an SMS-PP download in realtime, and the statuses of the supplementary services can be checked instantly when a user so desires. Accordingly, the present invention increases user convenience and reduces cost. Further, the supplementary services for which a user has registered are separate from the supplementary services for which the user has not registered, further increasing user convenience. Furthermore, activation statuses of various supplementary services are simultaneously displayed on a screen, so that a user can conveniently check the statuses of the supplementary services. In addition, the inconvenience of considering other related services requested by a provider such as a CPHS, is avoided by the present invention. Moreover, an update is performed in realtime, so that reliability can be improved.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An apparatus for displaying a status of a supplementary service of a Mobile Equipment (ME), the apparatus comprising:
a network for processing a request for registration, activation or release of a supplementary service from the ME;
a card for storing an elementary file including-t-he a current activation status of the supplementary service of the ME received from the network when the card has been inserted into the ME; and
an SMS service center for informing the ME of processing results for the registration, activation or release of the supplementary service,
wherein the network transmits a command packet for storing data in the card or deleting data previously stored in the card to the SMS service center.

2. The apparatus as claimed in claim 1, wherein the network includes a home location register for storing the status of the supplementary service of the ME.

3. The apparatus as claimed in claim 1, wherein the card includes a Subscriber Identity Module (SIM).

4. The apparatus as claimed in claim 1, wherein the ME includes a display unit for displaying the current activation status of the supplementary service, which is stored in the card, in response to user input.

5. The apparatus as claimed in claim 1, wherein the ME analyzes a header of a received SMS message in order to determine if the received message is a Point-to-Point (PP) download SMS message, and transfers the received message to the card when the received message is the PP download SMS message.

6. The apparatus as claimed in claim 5, wherein, when the received message is the PP download SMS message, the ME creates an envelop command from the received message, and transfers the envelop command to the card.

7. The apparatus as claimed in claim 1, wherein the command packet includes a class for defining a communication scheme, a selection scheme, length of data, and the data.

8. The apparatus as claimed in claim 1, wherein the network further comprises an Over The Air (OTA) server for communicating with the ME.

9. The apparatus as claimed in claim 1, wherein the elementary file is disposed under an Application Dedicated File (ADF) and includes four bytes.

10. A method for reporting a status of a supplementary service in a Mobile Equipment (ME) which can store information on a card, the method comprising the steps of:

storing on the card an elementary file including a current activation status of the supplementary service of the ME received from a network, when the card has been inserted into the ME;

receiving processing results for registration, activation or release of the supplementary service from an SMS service center;

checking if a request for a current activation status of a supplementary service is inputted;

reading information for the current activation status of the supplementary service from the card when the request is inputted; and simultaneously displaying the read information;

wherein the network transmits a command packet for storing data in the card or deleting data previously stored in the card to the SMS service center.

* * * * *